US011983580B2

(12) United States Patent
Knotts et al.

(10) Patent No.: US 11,983,580 B2
(45) Date of Patent: May 14, 2024

(54) REAL-TIME MODIFICATION OF APPLICATION PROGRAMMING INTERFACE BEHAVIOR

(71) Applicant: Box, Inc., Redwood City, CA (US)

(72) Inventors: Ryan Knotts, San Jose, CA (US); Marley Paige Zelinger, San Francisco, CA (US); Jón Tómas Grétarsson, Redwood City, CA (US)

(73) Assignee: Box, Inc.

( * ) Notice: Subject to any disclaimer, the term of this patent is extended or adjusted under 35 U.S.C. 154(b) by 89 days.

(21) Appl. No.: 17/452,773

(22) Filed: Oct. 28, 2021

(65) Prior Publication Data

US 2023/0133938 A1    May 4, 2023

(51) Int. Cl.
| | |
|---|---|
| G06F 9/54 | (2006.01) |
| G06F 16/23 | (2019.01) |
| G06F 21/62 | (2013.01) |

(52) U.S. Cl.
CPC .......... *G06F 9/541* (2013.01); *G06F 16/2379* (2019.01); *G06F 21/6245* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 2006/0075228 A1* | 4/2006 | Black | ................... | H04L 63/104 713/167 |
| 2007/0255781 A1* | 11/2007 | Li | .......................... | H04L 67/56 709/201 |
| 2010/0005509 A1* | 1/2010 | Peckover | ............ | H04L 63/0281 726/3 |
| 2018/0121440 A1* | 5/2018 | Maquaire | ............ | G06F 16/2365 |
| 2019/0199519 A1* | 6/2019 | Goyal | ................ | G06F 21/6218 |
| 2020/0201918 A1* | 6/2020 | Karande | ............... | G06F 16/957 |

(Continued)

OTHER PUBLICATIONS

"Content type conversions in API Gateway", dated Sep. 17, 2020, URL: https://docs.aws.amazon.com/apigateway/latest/developerguide/api-gateway-payload-encodings-workflow.html.

(Continued)

*Primary Examiner* — Charles E Anya
(74) *Attorney, Agent, or Firm* — Vista IP Law Group, LLP

(57) ABSTRACT

Methods, systems, and computer program products for application-specific, real-time modification of application programming interface behavior. Meaning is derived from analysis of human-readable intelligence found in a collaboration object of a content management system. The meaning is used to inform the behavior of an application programming interface that is exposed to applications that interface with the content management system. The content management system invokes a range of analysis modules that examine the human-intelligible contents of a requested collaboration object to determine meaning from the human-intelligible contents. Content-derived tags are emitted based on the analysis. When the application invokes an entry point of the API, a set of content-derived tags are associated with the application, and the occurrence and/or values of the content-derived tags are then used in rules. The results of evaluation of the rules determine how the API will respond to the application.

20 Claims, 11 Drawing Sheets

(56) References Cited

U.S. PATENT DOCUMENTS

2021/0182439 A1\*  6/2021  Singh .................... G06F 21/629
2021/0194888 A1\*  6/2021  Bhaskar S ............ H04L 63/105

OTHER PUBLICATIONS

"Controlling and managing access to a Rest API in API Gateway", dated May 26, 2020, URL: https://docs.aws.amazon.com/apigateway/latest/developerguide/apigateway-control-access-to-api.html.

"Create and attach an API Gateway resource policy to an API," dated Jan. 18, 2021, URL: https://docs.aws.amazon.com/apigateway/latest/developerguide/apigateway-resource-policies-create-attach.html.

"API Gateway resources that can be tagged," dated Jan. 16, 2021, URL: https://docs.aws.amazon.com/apigateway/latest/developerguide/apigateway-tagging-supported-resources.html.

"Control access for invoking an API," dated Feb. 24, 2021, URL: https://docs.aws.amazon.com/apigateway/latest/developerguide/api-gateway-control-access-using-iam-policies-to-invoke-api.html.

Wilson, James, et al., "Preventing Malware in Serverless Web Applications with SophosLabs Intelix," AWS Partner Network (APN) Blog, dated Apr. 28, 2021.

"Enabling binary support using the API gateway Rest API", dated Mar. 29, 2021, URL: https://docs.aws.amazon.com/apigateway/latest/developerguide/api-gateway-payload-encodings-configure-with-control-service-api.html.

"How API Gateway resource policies affect authorization workflow," dated Jan. 21, 2021, URL: https://docs.aws.amazon.com/apigateway/latest/developerguide/apigateway-resource-policies-examples.html.

"Controlling access to an API with API Gateway resource policies," dated Oct. 5, 2020, URL: https://docs.aws.amazon.com/apigateway/latest/developerguide/apigateway-resource-policies.html.

"Build an API Gateway Rest API with Lambda integration," dated May 14, 2020, URL: https://docs.aws.amazon.com/apigateway/latest/developerguide/set-up-lambda-integrations.html.

"Using tags to control access to API Gateway resources," dated per Google as May 25, 2019, URL: https://docs.aws.amazon.com/apigateway/latest/developerguide/apigateway-control-access-tags.html.

"How Anti-Virus Software Works", Stanford.edu, dated 2000, URL: https://cs.stanford.edu/people/eroberts/cs181/projects/2000-01/viruses/anti-virus.html.

"Identity-based policies and resource-based policies," dated Jun. 17, 2020, URL: https://docs.aws.amazon.com/IAM/latest/UserGuide/access_policies_identity-vs-resource.html.

"Use API Gateway Lambda authorizers," dated Apr. 5, 2020, URL: https://docs.aws.amazon.com/apigateway/latest/developerguide/apigateway-use-lambda-authorizer.html.

"Malware mitigation process," dated Dec. 16, 2021, URL: https://docs.aws.amazon.com/managedservices/latest/userguide/malware-mitigation.html.

"Control access to an API with IAM permissions," dated May 14, 2020, URL: https://docs.aws.amazon.com/apigateway/latest/developerguide/permissions.html.

"AWS managed policies for AWS Identity and Access Management Access Analyzer," dated Aug. 28, 2021 URL: https://docs.aws.amazon.com/IAM/latest/UserGuide/security-iam-awsmanpol.html.

"Wikipedia Entry: Tag (Metadata)," last date of edit for reference Nov. 3, 2021 , URL: https://en.wikipedia.org/wiki/Tag_(metadata).

\* cited by examiner

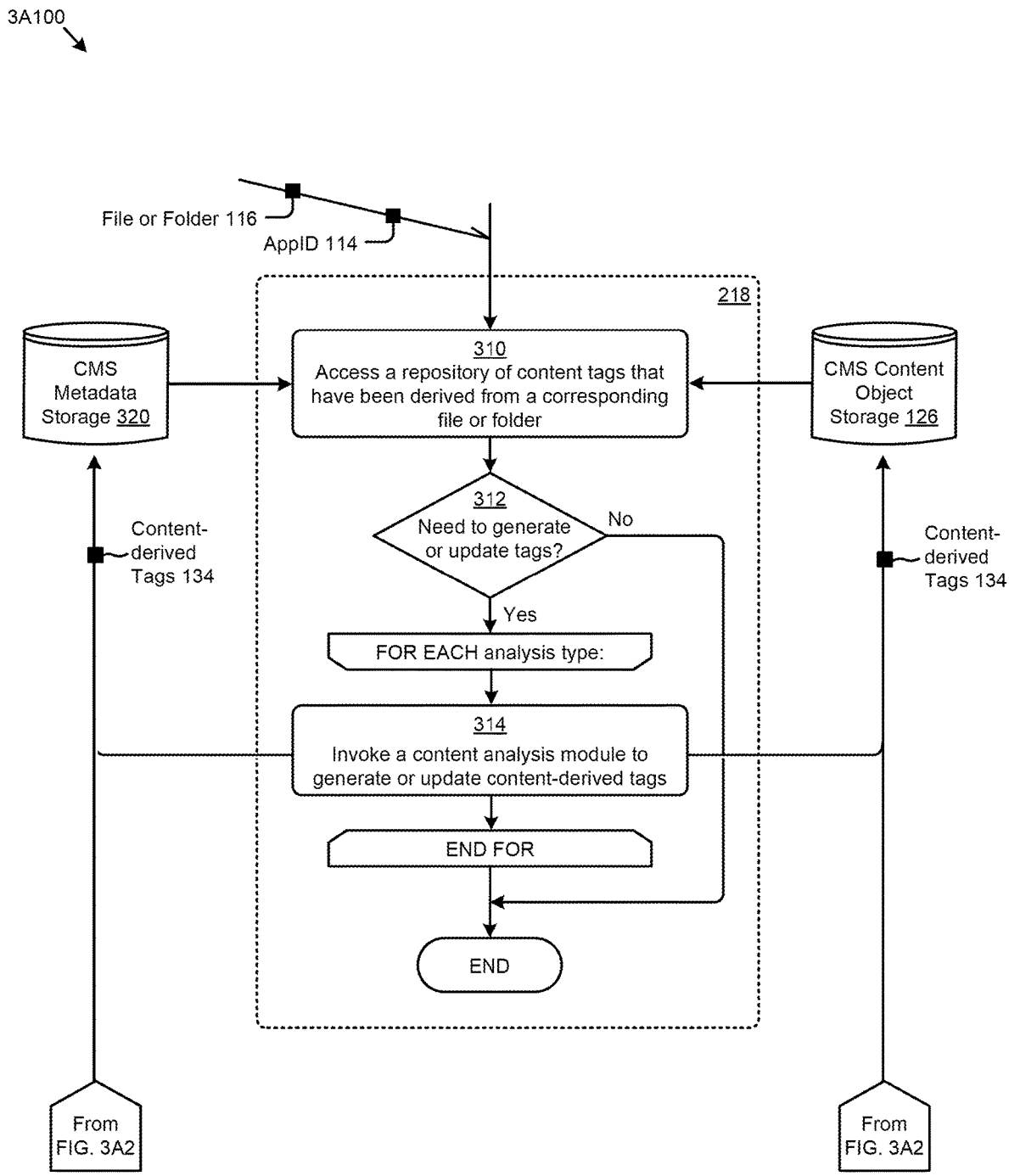
FIG. 3A1

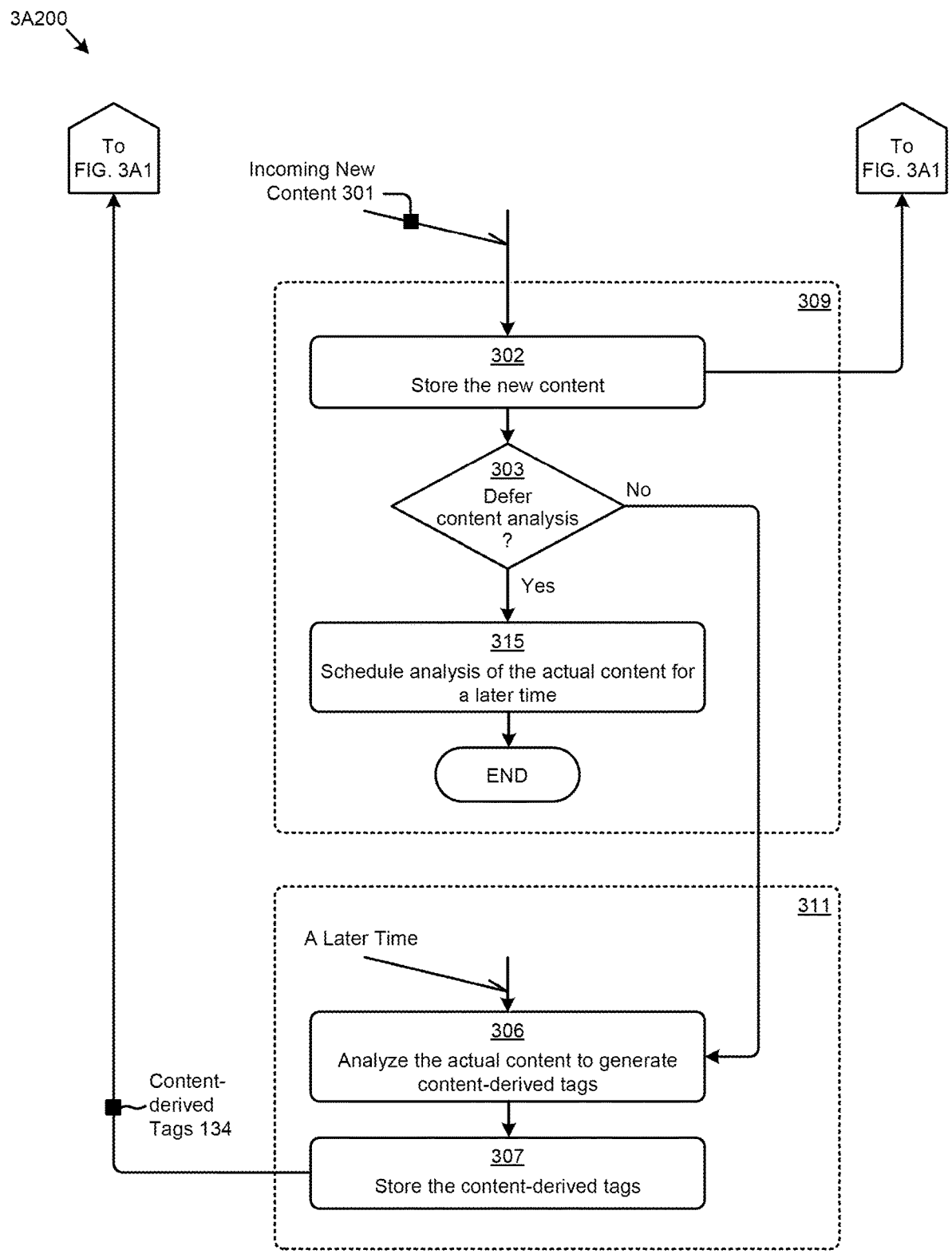
FIG. 3A2

REAL-TIME MODIFICATION OF APPLICATION PROGRAMMING INTERFACE BEHAVIOR

TECHNICAL FIELD

This disclosure relates to content management systems, and more particularly to techniques for real-time modification of application programming interface behavior.

BACKGROUND

The emergence of content management systems (CMSs) that foster collaboration over electronic documents has changed the way people work with electronic documents. In prior times, before the proliferation of computer-based documents, collaborators had to endure the latency of "snail mail" (hand delivery of physical documents in paper form). Even in the connected world, where virtually everyone has an email alias, there is often still latency in some practices such as "baton passing" where electronic documents are worked-on by one collaborator and then sent as an email attachment to the next collaborator, and so on.

Modern collaboration systems have seized on the benefits of the "always online", "world-wide connected" communication environment in which we now live. Now, collaborators can access documents concurrently and in some cases multiple collaborators can actually edit the same shared document at the same time—even though the user devices that the various collaborators are using to access the same shared document might be situated many time zones apart. This is possible because modern user devices can access computer functionality through a technique called application programming interfaces (API) and/or web services that are exposed. Calls to an API or access to a web service can be made from any location, anywhere in the world, from nearly any kind of a user device (e.g., desktop computer, laptop computer, smart phone, etc.)

Due to the mere fact that the APIs and/or web services are exposed to the public, it follows that the functions that underly the APIs and/or web services need to be secure. In particular, the functions that underly the APIs and/or web services need to implement authentication and authorization policies and checks. That is, the functions that underly the APIs and/or web services need to confirm (1) that the user or user device who/that is making the call to the API and/or web service is actually the person or device that they are holding out to be, and (2) that the authenticated user or device has sufficient access rights, permissions, and/or privileges (e.g., to READ, to WRITE, to DELETE, etc.) for carrying out a requested type of access. To accommodate this, publicly-facing APIs and/or publicly-facing web services include authentication and access check hurdles, both of which must be surmounted before any accesses to any electronic documents can be granted. That is, once a user or user device is authenticated as being the person or device that they are holding out to be, then rights, permissions, and/or privileges corresponding to the authenticated entity are looked up (e.g., from a database) to retrieve the then-current rights, permissions, and/or privileges. If the then-current rights, permissions, and/or privileges are sufficient to grant the requested scope of access, then that particular request is allowed to continue. Otherwise, the request is denied and an error status is emitted.

In some situations, even this two-step approach is sometimes insufficient. That is, as a consequence of the proliferation of applications or "apps" that are hosted on a user device, further security vulnerabilities are introduced, some of which security vulnerabilities are not addressed merely by the aforementioned authentication and authorization checks. In some cases, such applications or "apps" have been pre-vetted (e.g., prior to posting to an "app store"), however in other cases the applications or "apps" might not have been pre-vetted. This introduces potential security risks, at least in the sense that an application or app might be, or contain, malware. To explain, an app that is (or contains) malware might be configured to "delete every file it finds." When using only the aforementioned authentication and authorization checks, if the user is properly authenticated, and if the user is permitted to "delete" files, the malaprop application can maliciously delete all of the files of the authenticated user.

This situation is further complicated when the files are files of a content management system, specifically files that are shared by a set of users of a collaboration group. In such a situation, still further safeguards might be appropriate—even if only to protect the users of the collaboration group from unintended or "rogue" accesses or deletions.

Unfortunately, legacy mechanisms that rely on merely authentication and authorization checks are woefully inadequate. What is needed is a technique or techniques to provide further safeguards that are called into play when a user accesses files or other objects of a content management system.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for real-time modification of application programming interface behavior, which techniques advance the relevant technologies to address technological issues with legacy approaches. More specifically, the present disclosure describes techniques used in systems, methods, and in computer program products for content-informed modification of application programming interface behavior. Certain embodiments are directed to technological solutions that modify API behavior based on tags that derive from analysis of content objects.

The disclosed embodiments modify and improve over legacy approaches. In particular, the herein-disclosed techniques provide technical solutions that address the technical problems attendant to implementing content-based application programming interface behavior. Such technical solutions involve specific implementations (e.g., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for intercomponent communication. For example, when performing computer operations that address the various technical problems underlying implementing content-based application programming interface behavior both memory usage and CPU cycles demanded are significantly reduced as compared to the memory usage and CPU cycles that would be needed but for practice of the herein-disclosed techniques for modifying API behavior based on tags that derive from analysis of content objects. Strictly as one case, the data structures as disclosed herein and their use serve to reduce both memory usage and CPU cycles as compared to alternative approaches. Moreover, information that is received during operation of the embodiments is transformed by the processes that store data into and retrieve data from the aforementioned data structures.

The ordered combination of steps of the embodiments serves in the context of practical applications that perform steps for modifying API behavior based on tags that derive from analysis of content objects. As such, techniques for modifying API behavior based on tags that derive from analysis of content objects overcome long standing yet heretofore unsolved technological problems associated with implementing content-based application programming interface behavior. Such problems arise in the realm of computer systems.

Many of the herein-disclosed embodiments for modifying API behavior based on tags that derive from analysis of content objects are technological solutions pertaining to technological problems that arise in the hardware and software arts that underlie content management systems. Aspects of the present disclosure achieve performance and other improvements in peripheral technical fields including, but not limited to, online collaboration systems and computer security.

Some embodiments include a sequence of instructions that are stored on a non-transitory computer readable medium. Such a sequence of instructions, when stored in memory and executed by one or more processors, causes the one or more processors to perform a set of acts for modifying API behavior based on tags that derive from analysis of content objects.

Some embodiments include the aforementioned sequence of instructions that are stored in a memory, which memory is interfaced to one or more processors such that the one or more processors can execute the sequence of instructions to cause the one or more processors to implement acts for modifying API behavior based on tags that derive from analysis of content objects.

In various embodiments, any combinations of any of the above can be organized to perform any variation of acts for content-informed modification of application programming interface behavior, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 3A1 presents a content-derived tag generation technique as used in systems that implement content-informed modification of application programming interface behavior, according to an embodiment.

FIG. 3A2 presents an alternative content-derived tag generation technique based on analysis of newly-incoming content, according to an embodiment.

DETAILED DESCRIPTION

Figure 1:
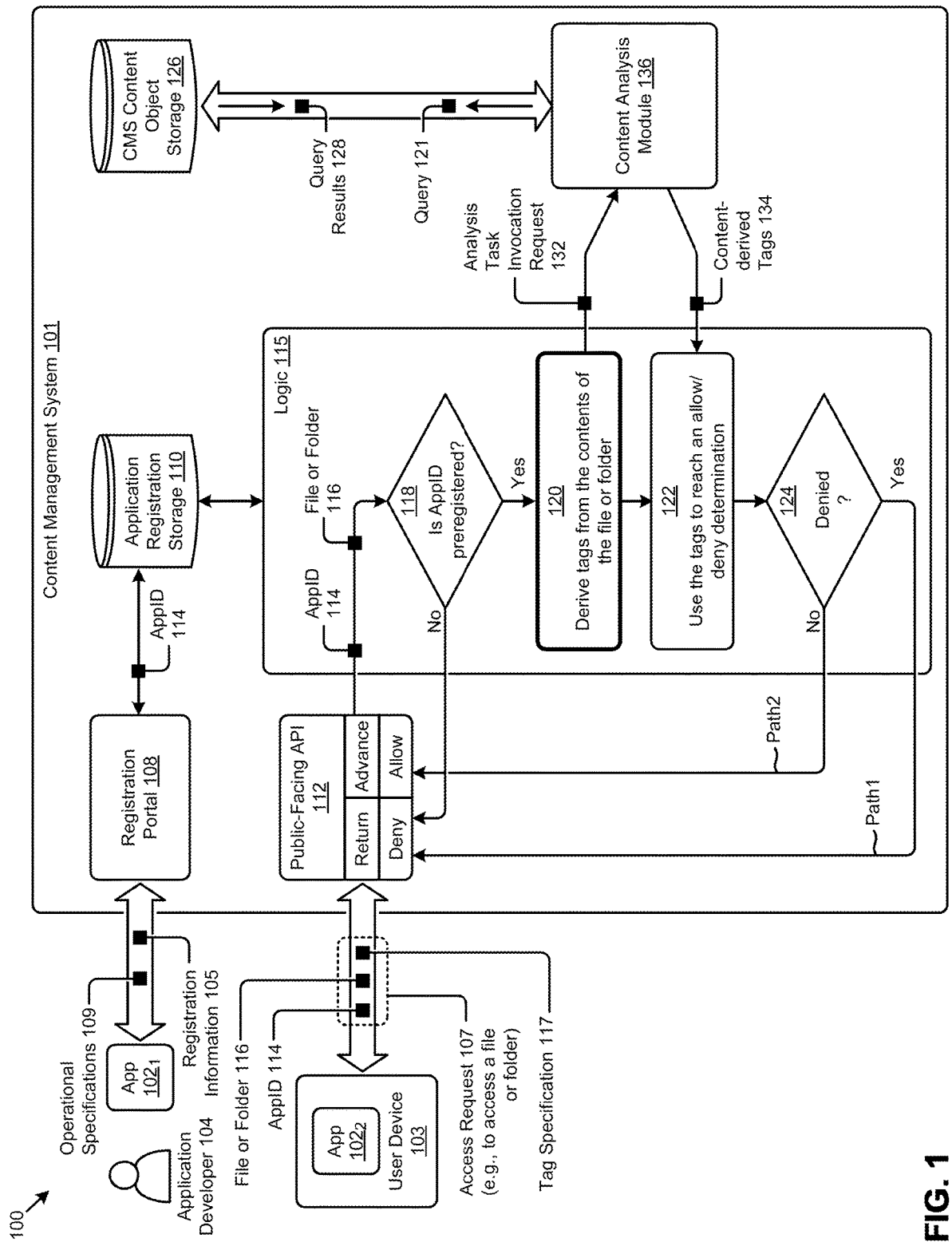
FIG. 1 exemplifies an environment in which embodiments of the present disclosure can be practiced.

Aspects of the present disclosure solve problems associated with using computer systems for content-based application programming interface behavior. These problems are unique to, and may have been created by, various computer-implemented methods for defining and managing content-based application programming interface behavior in the context of content management systems. Some embodiments are directed to approaches for modifying API behavior based on tags that derive from analysis of content objects. The accompanying figures and discussions herein present example environments, systems, methods, and computer program products for content-informed modification of application programming interface behavior.

Overview

Content management systems (CMSs) have been a boon to the way people work with electronic documents. Due to advances in content management systems as well as advances in the capabilities of communication infrastructure (e.g., the Internet), it is now possible to not only have remote access to shared files, but to perform a wide range of collaboration activities over such shared documents. One common approach to providing access to the shared documents, and more particularly, one common approach to providing a range of collaboration activities is to publish so-called public-facing application programming interfaces (APIs). While deployment of these so-called public-facing APIs allows for access by users from virtually anywhere in the world, it also opens up certain vulnerabilities that need to be managed. Strictly as one example, consider the situation where a certain set of documents are considered to be sensitive.

In such a case, an API should respond to a requested access from a device over the public Internet in a manner that allows or denies access based on (1) authentication of the user device (e.g., to ensure that the user is indeed the user he or she is purporting to be), and (2) authorization of the particular operation or operations (e.g., READ, EDIT, PRE- VIEW, DELETE, etc.) that correspond to the requested access. Now further consider that the requested access might be allowed or denied based on the specific tagging of a content object corresponding to the request. More particularly, even if the aforementioned set of sensitive documents are sequestered in some access-controlled area and/or otherwise subjected to authentication and authorization, it might happen that one of the collaborators makes an entry in one of the documents (e.g., some piece of personally identifiable information (PII) such as a personal telephone number or a social security number) that should more narrowly restrict access to that document.

In this situation, in order to control the narrower access to the document, there needs to be some means to modify the behavior of the API based on a recognition that the sought-after content object now contains PII and thus, the more narrow access considerations should become in effect. The foregoing scenario as well as other scenarios that are frequent in collaboration settings can be addressed by implementing content-informed modification of application programming interface behavior. In this case, the application programming interface behavior is dynamically changed when it is determined that the contents of the document has changed. Continuing, the application programming interface behavior is dynamically changed when it is determined that access should change (e.g., become more restricted) based on (1) aspects of the requesting user in combination with (2) the nature of changes made to the requested document.

The appended figures and discussions thereto are merely examples of systems and techniques that implement content-informed modification of application programming interface behavior.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies an environment in which embodiments of the present disclosure can be practiced. As an option, one or more variations of environment 100 or any aspect thereof may be implemented in the context of the architecture and functionality of the embodiments described herein and/or in any environment.

This figure is being presented in order to illustrate how content management system 101 can be interfaced to the public Internet via public-facing APIs. More specifically, this figure is being presented in order to illustrate how a content management system can implement logic that is informed by the actual content of documents of the CMS. Still further, this figure is being presented in order to illustrate how a content management system can be a repository for registered applications or "apps" that are developed specifically to be able to provide functionality based on the actual content of documents of the CMS.

As shown, an engineer (e.g., application developer 104) can define (e.g., code) an application (e.g., app $102_1$). When the app is ready, the engineer can register the app (e.g., via registration portal 108) by providing registration information 105 and operational specifications 109. The registration portal 108 can analyze such registration information and operational specifications, permit or deny registration of the app and, in cases where the app is permitted to be registered with the CMS, a unique application identifier (e.g., appID 114) is assigned to the app. Various aspects of the app itself (e.g., a version number and/or checksum of the executable), the registration information (e.g., date, time, author, authentication certificate, etc.), and the operational specifications (e.g., rules, restrictions, tests, tags, etc.) may be stored in application registration storage 110 for later retrieval. In some cases, an app is associated with specific tags upon registration. This can be accomplished by (1) establishing an association between the app and any tags provided in the operational specifications, or by (2) establishing an association between the app and any tags provided in CMS metadata.

An association between the app and any tags provided in CMS metadata can be established at any point in time, including even after the app has been deployed. Strictly as an example, consider a scenario where a progression state of a workflow changes as the workflow progresses. Further consider the situation when at some later moment in time (e.g., after the app has been deployed) an administrator changes some aspect of the workflow (e.g., changing a version of the workflow, or changing/adding a new state or feature to the workflow, changing the deployment designation of the workflow, changing the execution priority of the workflow, etc.). The behavior of the API can be responsive to the occurrence of and/or nature of newly-defined metadata and/or newly-defined tags, and/or newly-established rules. To illustrate, consider that there can exist an app that is intended to permit viewing of only certain ones of the progress states (e.g., in the event there are certain states should not be exposed). In such a scenario, a visibility tag can be defined, a rule to enforce visibility (or invisibility) of only certain ones of the progress states can be enabled, and the app can be associated with the visibility tag and/or the rule. When such a rule is fired, any visibility tags are considered, and based at least in part on the value or values of the visibility tags, the workflow progress state is conditionally returned to the calling application.

Once an app has been permitted to be registered, the app can be loaded onto a user's computing equipment (e.g., user device 103) executed at will by the user. In the illustrative case shown, an instance of the registered app (e.g., app 1022, which is an instance of app 1021) can be used to raise an access request 107 via a call to public-facing API 112. In the example shown, access request 107 includes (1) an appID, (2) an indication of a specific file or folder 116, and (3) a tag specification 117. The appID of the access request refers to the particular appID that was assigned in the foregoing registration process. This appID can be used for authentication of the app such that the content management system can restrict access through certain entry points of the public-facing API to only those apps that have been verifiably preregistered. The tag specification of the access request refers to any one or more tags (e.g., metadata items) and/or tag values (e.g., metadata item values) that correspond in some way to the specific file or folder identified in the access request.

In the specific embodiment of FIG. 1, logic 115 is implemented within the bounds of the content management system. Such logic 115 can perform a test (e.g., at decision 118) to determine if the appID corresponds to an appID that has been designated in the application registration storage. If not, then the API call is deemed to be insufficiently credentialed, the "No" branch of decision 118 is taken, and the request is denied (e.g., as designated by the "Deny" option of public-facing API 112). On the other hand, if it is determined that the appID given in the access request does indeed correspond to an appID that is in the application registration storage, then the "Yes" branch of decision 118 is taken, and further steps of logic 115 are performed.

As previously discussed, the CMS can implement logic that is informed by the actual content of documents of the CMS. Moreover, analysis of the actual content of documents of the CMS can be performed in real time, responsive to an incoming collaboration object access request through the public-facing API. The embodiment of FIG. 1 includes step 120 that derives tags from the actual contents of the files or folders corresponding to the access request. As shown, step 120 implements a technique to analyze the actual content of documents of the CMS where an analysis task invocation request 132 presented to content analysis module 136. The content analysis module in turn may form a query 121 that is performed over CMS content object storage 126. Execution of the query produces query results 128, which query results are further processed so as to provide a set of content-derived tags 134.

As used herein, content-derived tags are metadata that represents results of analysis of a collaboration object. More particularly, a content-derived tag might correspond to a value of some particular metadata item, where the value is a result of some particular analysis of the particular contents of a collaboration object As an example, analysis of a content object in the form of a file, "Credit Card Application.doc" might result in an association between the file, "Credit Card Application.doc" and a metadata item "HasPersonallyIdentifiableInformation". The tags and values can be at any level of detail. Continuing the foregoing example, analysis of the file, "Credit Card Application.doc" might result in a metadata item "HasPhoneNumber", or "HasSocialSecurityNumber". The mere presence of tags, as well as the specific values of tags can be used in logic of the CMS.

As used herein a "collaboration object" is any computer-readable, electronically-stored data that is made accessible to a plurality of users. Different users may each have respective permissions to access the electronically-stored data. The electronically-stored data may be structured as a file, or as a folder/directory, or as metadata.

As pertains to FIG. 1, step 122 of logic 115 uses any content-derived tags (e.g., as received from content analysis module 136) so as to reach an allow/deny determination. That determination is then used in logic (e.g., decision 124) to cause the public-facing API to deny the request (e.g., via the "Yes" branch of decision 124, over path1) or to allow further processing of the request (e.g., via the "No" branch of decision 124, over path2). Strictly as one example of processing of the request, consider the case where the access request was to edit the file "Credit Card Application.doc". In this case, the request is deemed to be allowed, and processing is advanced such that the file "Credit Card Application.doc" is opened for READ/WRITE access.

The environment of FIG. 1 can be established using any known techniques. In one setting, establishing the environment of FIG. 1 for practice of the herein-disclosed techniques can be accomplished by performing some setup operations, and then performing some ongoing operations. One example implementation of setup operations and ongoing operations are shown and discussed as pertains to FIG. 2.

Figure 2:
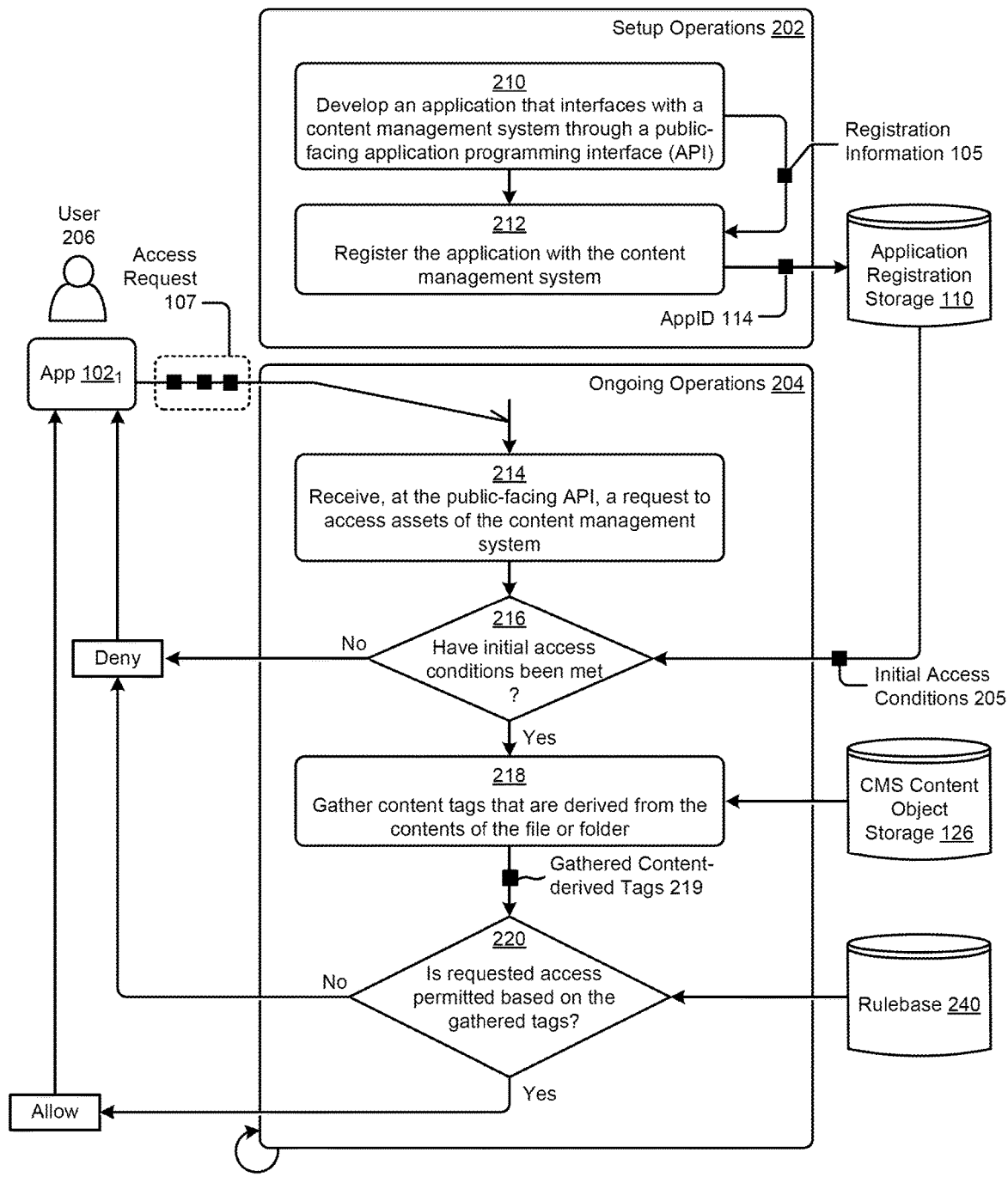
FIG. 2 presents a series of operations that are carried out in systems that implement content-informed modification of application programming interface behavior, according to an embodiment.

FIG. 2 presents a series of operations that are carried out in systems that implement content-informed modification of application programming interface behavior. As an option, one or more variations of series of operations 200 or any aspect thereof may be implemented in the context of the architecture and functionality of the embodiments described herein and/or in any environment.

As shown, the foregoing series of operations are logically divided into setup operations 202 and ongoing operations 204. Once the setup operations have at least initiated, then performance of the ongoing operations can commence. The specific set of setup operations is merely an illustrative set of setup operations and are not in any way limiting or exhaustive. As shown, the setup operations pertain to (1) development of an application that accesses the content management system through a public-facing API (step 210), and (2) registration of the application with the content management system (step 212). This particular series of setup operations presupposes the existence of a public-facing API. As used herein, a public-facing API refers to any computer-reachable application programming interface access point into a content management system. The computer-reachable access point can be implemented as a uniform resource identifier (URI) or as a uniform resource locator (URL). In some cases, a call or other type of access is backed by a subroutine or a function or a web service that is implemented, in whole or in part by a content management system.

In response to performance of the foregoing subroutine or function or web service, which is in turn in responsive to a request from an application or app (which terms are used interchangeably throughout the disclosure herein), a response is provided to the requestor. In some cases, the response provided to the requestor is merely a denial, possibly with a reason for the denial. In other cases, the response provided to the requestor is some form of access (e.g., READ, WRITE, DELETE, EXECUTE, etc.) to a requested content object of the content management system. In still other cases, the response provided to the requestor is some information pertaining to the content management system that can be provided even in absence of an access to a content object of the content management system. For example, an API call into the public-facing API might correspond to a "null" operation such that the caller can assess round-trip network latency between the user device that raised the API call to the "null" operation.

Returning to the discussion of the shown setup operations, and more specifically, returning to the discussion of step 210, when an application developer deploys an application for use with the content management system, the developer can provide various registration information 105 which, in turn, is used to register the application with the content management system. Such registration information may include an indication of an author, an indication of a version, a human-readable indication of the function of the application, a designation of a certificate, etc. Some or all of the registration information can be considered when registering the application with the content management system (step 212). Moreover, when registering the application with the content management system, an AppID 114 is generated by or on behalf of the content management system. The appID, plus any of the foregoing registration information 105 is stored in application registration storage 110, which is made available to ongoing operations. In particular, and specifically with respect to modifying application programming interface behavior based on content-derived tags, the foregoing registration information may include a designation of tags of interest to the application.

The shown ongoing operations are merely to illustrate one possible sequence of processing steps. Moreover, the shown ongoing operations are representative of merely one instance of a computer module that can receive an access request 107 from an application, perform processing based at least in part on the nature of the access request, and return some indication back to the calling application. In many implementations, the ongoing operations run on one or more processor threads that are specific to each occurrence of a received access request. As such, any number of access requests from any number of applications can be processed concurrently.

As shown, access request 107 can be raised by app $102_1$, possibly due to interaction by user 206 with the app, or possibly due to autonomous operation of the app independent of user interaction (e.g., based on occurrence of a timer event or based on occurrence of a condition in the environment).

The access request is directed to a particular access point (e.g., URI or URL) of the public-facing API. Upon receipt of the access request (step 214) various tests are undertaken, which tests serve to determine whether conditions are present such that the access request should be allowed (and then advanced), or whether the access request should be denied (with some indication returned to the caller). In a first phase of performing these tests, a set of initial access conditions 205 are considered (e.g., via decision 216). Strictly for illustration, Table 1 presents example initial access conditions that are considered in a first phase. If any of the tests fail, the access is denied.

TABLE 1

Initial access conditions

| Condition Name | Condition Test |
| --- | --- |
| Preregistration | Is the app that raised the access request a preregistered app (e.g., is the appID present in the application registration storage)? |
| Network Security | Does the network path between the app and the endpoint include any disallowed hops? |
| Version | Is the version of the app permitted to access this endpoint? |
| Multi-factor Authentication | Does the app that raised the access request properly respond to a single or multifactor challenge? |
| Tag Presence | Does the content object (if any) to which the access request corresponds have an association to a specific tag? |
| Tag Value | Does the content object (if any) to which the access request corresponds have a specific tag value? |

If all of the conditions that are considered initial access conditions for this particular application are satisfied, then the "Yes" branch of decision 216 is taken. In a second phase, additional tests are carried out (e.g., via determination 220). On the other hand, if any of the initial access conditions are not satisfied, then the "No" branch of decision 216 is taken and the access request is denied.

In the shown set of ongoing operations 204, if all of the conditions that are considered in the first phase are satisfied, then processing advances to step 218. Step 218 accesses CMS content object storage 126 to gather content tags that are derived from the actual content of documents of the CMS. Such gathering may include gathering of content-derived tags that have been previously calculated, and/or such gathering may include gathering content-derived tags that are calculated in real-time (e.g., during the progression through step 218). In some situations, certain content-derived tags are calculated asynchronously with respect to processing of an access request (e.g., in a background scan or batch process). For example, any number of content objects can be background scanned to identify human-readable intelligence (e.g., a person's name, a person's address, etc.), and to identify the existence and type of PII. In the event that human-readable intelligence in the form of PII is found in a content object, then applicable content-derived tags (e.g., in the form of metadata) can be associated with the content object. In some cases, the mere presence/existence of a content-derived tag (e.g., "HasPersonallyIdentifiableInformation") that is associated to a corresponding content object can be used in a rule. In other cases, it is the then-current value of a content-derived tag (e.g., "HasPersonallyIdentifiableInformation=PhoneNumber") that is used in a rule.

In some cases, the determination of which content-derived tags are of interest to the application and/or which content-derived tags are relevant to the access request is made based on the tag specification that is given in the access request itself. In other cases, the determination of which content-derived tags are of interest is made based on information in the application registration storage. In still other cases, the determination of which content-derived tags are of interest is made based on machine learning (ML) models that are operational within the application, and/or based on machine learning models that are operational within the content management system, or both.

Referring to the former case where content-derived tags of interest are made based on machine learning models that are operational within the application, consider a situation where a scan of a page is made using the camera of the user's user device. The application can be configured such that the scan is checked at the user device for presence of personally identifiable information. Machine learning, performed by the application at the user device can be applied to determine if the scan contains personally identifiable information, and if so, a content-derived tag can be associated with the scan object. The content-derived tag that is associated with the scan object can then be provided through the public-facing API to the content management system. As another example where content-derived tags are made based on machine learning models that are operational within the application, consider a machine learning module that considers then-current environmental factors (e.g., the security level of the network, the geography, vulnerabilities of the operating system of the user device, etc.) with respect to the intelligible contents of a document in making a determination to permit or deny user upload of that document. For example, if the machine learning module determines that the environment is insecure or vulnerable, the machine learning module might apply a tag to the content object to indicate that the content of the document is deemed as being "suspicious". Moreover, if the machine learning module determines that the environment is insecure or vulnerable with respect to the human-intelligible contents of the document, the machine learning module might apply a tag to the content object to indicate that the content of the document is deemed as being "suspicious". Accordingly, an attempted upload of the document through the public-facing API might be processed differently based on the content-derived tags that were applied by the machine learning module of the user device.

Further details regarding general approaches for determining if a document is deemed to be suspicious are described in U.S. application Ser. No. 16/948,779 titled "DETECTING ANOMALOUS DOWNLOADS" filed on Sep. 30, 2020, which is hereby incorporated by reference in its entirety.

Referring now to the latter case where the determination of which content-derived tags are of interest is based on machine learning models that are operational within the content management system, consider the situation where a video clip had been uploaded through the public-facing API. One or more machine learning modules could be deployed to tag the video clip with an indication of the determined subject of a conversation that is detected in the video clip. Execution of the machine learning models can take place within the content management system itself, or execution of the machine learning models can take place elsewhere under direction of the content management system.

Further details regarding general approaches to tagging based on machine learning models are described in U.S. Pat. No. 11,074,475 titled "INTEGRATING EXTERNAL DATA PROCESSING TECHNOLOGIES WITH A CLOUD-BASED COLLABORATION PLATFORM", which is hereby incorporated by reference in its entirety.

Referring again to the latter case where the determination of which content-derived tags are of interest is based on machine learning models that are operational within the content management system, consider the situation where the public-facing API allows or denies access a particular content object based temporal state determination. For example, access to a particular document might be denied or restricted based on the signed date or effective date of the document, which signed date or effective date of the document can be determined by analyzing human-intelligible portions of the document to identify the signed date or effective date of the document.

Again, referring to the latter case where the determination of which content-derived tags are of interest is based on machine learning models that are operational within the content management system, it can happen that newly-generated tags of interest may arise in the content management system even after the deployment and registration of the application that raised the access request.

Returning to discussion of the set of ongoing operations 204, when processing of step 218 concludes, a set of gathered content-derived tags 219 are made available to determination 220. Determination 220, in turn, considers the gathered tags and tests as to whether the requested access should be denied (e.g., at the "No" branch of determination 220), or allowed to advance (e.g., the "Yes" branch of determination 220).

During the course of carrying out determination 220, a rulebase 240 might be accessed. Such a rulebase may be composed of logical expressions (e.g., referring to then-current conditions and/or tag values) and corresponding results (e.g., next actions) to be taken on the basis of evaluating the logical expressions. In exemplary embodiments, a rulebase further includes a correspondence between a specific registered application and a set of tag tests.

Strictly to illustrate, Table 2 depicts a correspondence between a specific registered application and a set of tag test rules. It should be noted that the tags referenced in the examples of the table are associated with the application rather than being associated with the access request itself. This offer a great deal of flexibility for the administrators of the content management system to define new "on-the-fly" rules that can be brought to bear even after the deployment and registration of the application that raised the access request. Consider ongoing workflow processing situations where an administrator changes a version of the workflow, or where an administrator adds a new state or feature to the workflow, or where an administrator changes the execution priority of the workflow. Further consider that the version, and/or the then-current state, and/or the execution priority of the workflow can inform how the public-facing API behaves. More particularly, and as can be seen in the foregoing examples, it can happen even after the deployment and registration of the application that raised the access request, administrators of the content management system can modify metadata of a workflow and/or define new "on-the-fly" rules that can be brought to bear to influence the operational behavior of the public-facing API.

Still further, any number of tag test rules can be associated with any application at any point in time merely by adding a tag test rule to the rulebase. More particularly, determination 220 may be configured to evaluate all logical expressions of all rules that correspond to a given registered application (e.g., based on the appID of the registered application). In the event that there are multiple different results as a consequence of evaluating all logical expressions of all rules that correspond to a given registered application, then the more restriction result is considered when making the determination as to whether the requested access is permitted based on the tags.

TABLE 2

Application-specific tag test rules

| AppID | Tag Test Rule (logical expressions over tags) | Result |
|---|---|---|
| appID123 | IF(Security_Level(<content object>) < Security_Level(appID123) = TRUE | Allow access request to advance |
| appID456 | IF(CONTAINS_PII(<content object>) AND Security_Level(USER(appID123)) == EXTERNAL | Deny access request |
| appID789 | IF(STATE_TAG(<workflow object>) == SECRET_PHASE | Deny visibility to the state of the workflow identified in the access request |

Referring to the rule, IF(CONTAINS_PII(<content object>) AND Security_Level (USER(appID123))==EXTERNAL, it should be noted that the entity referred to herein as a user (e.g., USER) is different from the entity referred to herein as an application (e.g., appID123). This difference is exploited in many of the herein-disclosed embodiments, at least in that a particular rule applied to a user can have a different result from the same rule being applied to an application. This garners further flexibility for the administrators of the content management system to define new "on-the-fly" rules that can be configured to interoperate with a given application merely by adding a tag test rule to the rulebase where the tag test rule that is added to the rulebase includes an association between a specific preregistered application and any number of tag tests. More specifically, as can now be understood, an administrator or user or other agent of the CMS can associate new tags with a given specific application. For example, an administrator or user or other agent of the CMS can associate new tags with a given specific application by adding registration information (e.g., registration information 105 of FIG. 2), and/or by modifying the contents of application registration storage (e.g., data structures of application registration storage 110 of FIG. 2). As such, when responding to an access request, the CMS can determine a full set of tags, possibly including any new tags (e.g., "on-the-fly" new tags) based on registration information of the specific application. Given the foregoing set of tags, the rules (e.g., logical expressions) of the rulebase can be scanned for existence of one or more rules that reference the one or more tags. If a rule is found that indeed references the one or more tags, that rule can be "fired". That is, if a rule is found that indeed references the one or more tags, that rule is applied to (e.g., evaluated with respect to) the incoming access request.

Other techniques for scanning a rulebase for existence of one or more rules that reference specific tags are possible. Strictly as an example, a data structure (e.g., a tree, a hashset, etc.) can be populated with entries that are accessed felicitously (e.g., on O=log(n), or on order O=1) based on a given tag. The entries might in turn point to one or more logical expressions that form the rule.

As heretofore discussed, gathering of tags may include gathering content-derived tags. Such content-derived tags can be determined (e.g., calculated) in real-time (e.g., during the progression through step 218). In some cases, the specific content-derived tags that are calculated in real time are content-derived tags that at least potentially need to be updated for the particular content object of interest. In some cases, the content-derived tags are content-derived tags that have never yet been generated for the particular content object of interest. Various techniques for doing so are shown and discussed as pertains to FIG. 3A1, FIG. 3A2, and FIG. 3B.

FIG. 3A1 presents a content-derived tag generation technique as used in systems that implement content-informed modification of application programming interface behavior. As an option, one or more variations of content-derived tag generation technique 3A100 or any aspect thereof may be implemented in the context of the architecture and functionality of the embodiments described herein and/or in any environment.

This figure is being presented to illustrate (1) how CMS content object storage 126 and/or CMS metadata storage 320 can be accessed so as to determine whether or not any content-derived tags 134 need to be generated or updated, and (2) how any number of analysis modules can be invoked when it is determined that one or more tags need to be generated or updated.

The content-derived tag generation technique 3A100 is presented as one possible implementation of the foregoing step 218. In this implementation, upon receipt of a content object of interest (e.g., file or folder 116), step 310 is invoked to access CMS content object storage 126 and/or CMS metadata storage 320 to identify content tags that have already been derived from earlier analysis of the particular file or folder. In some cases, the tags of interest have already been generated. However, in other cases, the tags of interest are either not present, or the tags of interest are stale and need to be updated. A determination as to whether certain tags (e.g., the tags specified in the rulebase) need to be generated or updated is encapsulated in decision 312. More specifically, in the case where the tags of interest are codified in the rulebase, then the set of tags of interest can be inferred from the logical expression of a rule.

Still more specifically, the specific rules, and therefore the logical expressions of the rules, and therefore the semantics of specific tags of interest, can be determined by accessing the rulebase with the given appID. For example, and referring again to Table 2, if the calling application is the application having appID456, then the semantics corresponding to CONTAINS_PII and the semantics corresponding to Security_Level are of interest for this API call. Accordingly, analysis modules that pertain to the semantics of the tag CONTAINS_PII and the semantics of the tag Security_Level are invoked (e.g., after taking the "Yes" branch of decision 312).

Invocation of such analysis modules (step 314) might have the effect of generating tags (e.g., when the tag of interest had not been previously generated) or might have the effect of updating a tag using then-current information. Such then-current information might pertain to the then-current version of the file or folder, or such then-current information might pertain to a changed rule or policy. Strictly as an example scenario, consider that a current version of a file or folder might have been updated to remove or redact all PII that was present in a previous version. As such, when a PII-specific analysis module is executed (e.g., in one iteration of step 314) then the test corresponding to CONTAINS_PII would return "No", whereas in a previous iteration the test corresponding to CONTAINS_PII had returned "Yes".

Any number of content analysis modules that correspond to any number of content analysis types can be invoked (e.g., via an analysis task invocation request 132 of FIG. 1) based on a determined set of tags of interest. In some situations, there can be a one-to-one mapping between a determined tag of interest and a corresponding content analysis module. In other situations, a single corresponding content analysis module can generate and/or update any number of tags of interest. In any of these situations, and responsive to the execution of any one or more of the foregoing content analysis modules, any number of content-derived tags 134 can be stored in CMS content object storage 126 and/or in CMS metadata storage 320. Moreover, any one or more of the foregoing content analysis modules can be invoked at any moment in time. For example, any one or more of the foregoing content analysis modules can be invoked immediately upon receipt of newly incoming content, or the foregoing content analysis modules can be scheduled for invocation at a later moment in time. Techniques for processing newly incoming content is shown and described as pertains to FIG. 3A2.

FIG. 3A2 presents an alternative content-derived tag generation technique based on analysis of newly-incoming content. As an option, one or more variations of content-derived tag generation technique 3A200 or any aspect thereof may be implemented in the context of the architecture and functionality of the embodiments described herein and/or in any environment.

This figure is being presented to illustrate how a newly-incoming content object 301 can be processed immediately, or can be processed at a later time.

Execution of step 302 causes the incoming new content to be stored into the CMS. Decision 303 serves to determine whether or not content analysis of the incoming new content can or should be processed immediately, or if content analysis of the incoming new content can or should be deferred. In the case that decision 303 determines that incoming new content can or should be deferred, the "Yes" branch of decision 303 is taken and at step 315, analysis of the incoming new content is scheduled to be carried out at a later time. On the other hand, if decision 303 determines that the incoming new content can or should be processed immediately, then the "No" branch of the decision to defer is taken and process 311 is entered immediately.

The steps of process 311 can be invoked at any moment in time. Specifically, and as shown, step 306 to analyze the contents of the incoming new content can be invoked immediately based on the "No" determination of decision 303 of process 309. Alternatively, step 306 to analyze the contents of the incoming new content can be invoked based on a schedule such as had been determined by step 315 of process 309. In both cases, analysis of the contents of the incoming new content results in emission (e.g., at step 307) of content-derived tags 134, which content-derived tags can be stored in a CMS metadata storage facility such as is shown in FIG. 3A1.

Further details regarding general approaches to determining how content is scheduled for analysis are described in U.S. application Ser. No. 17/163,222 titled "PRIORITIZING OPERATIONS OVER CONTENT OBJECTS OF A CONTENT MANAGEMENT SYSTEM" filed on Jan. 29, 2021, which is hereby incorporated by reference in its entirety.

The foregoing analysis (e.g., the analysis of step 306) can take many forms, and/or can operate over many variations or types of data of the CMS. A selection of CMS data analysis techniques is shown and described as pertains to FIG. 3B.

Figure 3B:
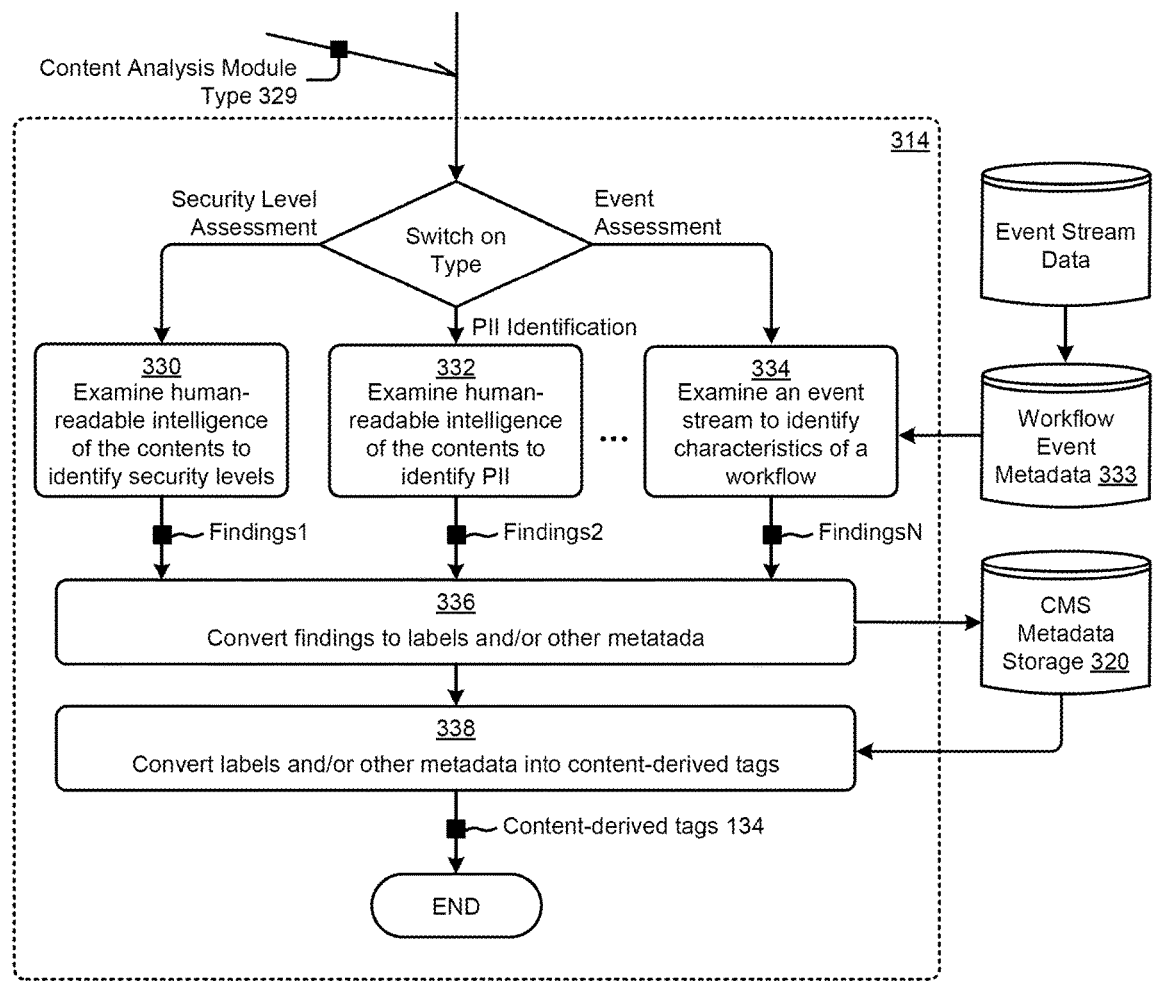
FIG. 3B presents several example CMS data analysis techniques as used in systems that implement modification of application programming interface behavior based on content-derived tags, according to an embodiment.

FIG. 3B presents several example CMS data analysis techniques as used in systems that implement modification of application programming interface behavior based on content-derived tags. As an option, one or more variations of the CMS data analysis techniques 3B00 or any aspect thereof may be implemented in the context of the architecture and functionality of the embodiments described herein and/or in any environment.

The shown CMS data analysis techniques and results of execution thereof are being presented as one possible implementation of step 314 of FIG. 3A1. In this implementation, upon receipt of a content analysis module type 329, a switch is entered. Based on the value of the content analysis module type, one of several CMS data analysis modules are invoked. In the particular depiction of FIG. 3B, there are three content analysis module types: (1) a module type for identification of human-readable intelligence within a content object and for performing a security level assessment of a content object based on the meaning of the human-readable intelligence, (2) a module type for identification of human-readable intelligence within a content object and for classifying such human-readable intelligence as PII, and (3) a module type for event assessment. Each of the foregoing three module types have a corresponding CMS data analysis module that can be invoked (e.g., as shown by step 330, step 332, and step 334). Moreover, each CMS data analysis module produces corresponding findings.

The findings (e.g., findings1, findings2, . . . , findingsN) can be used to inform step 336 that converts findings into labels and/or other metadata, which labels and/or other metadata are stored in CMS metadata storage 320. When at least a portion of step 336 completes, then processing moves to step 338, which serves to converts labels into content-derived tags 134.

As used herein, content analysis or content-based analysis refers to analysis of human-readable intelligence by considering the meaning of human-readable words within a collaboration object. As used herein, a security level assessment refers to analysis of human-readable intelligence by considering the meaning of human-readable words within a collaboration object and relating the meaning to parameters or tags. As used herein a security-related content-derived tag refers to a characteristic that is determined by analysis of human-readable intelligence by considering the meaning of human-readable words within a collaboration object and relating the meaning to parameters or metadata. As used herein, identification of PII refers to analysis of human-readable intelligence by considering the meaning of human-readable words within the content and relating the meaning to a particular type of PII.

Now, returning to the discussion of step 334, specifically the module for event assessment, it can sometimes happen that occurrence of a particular event of an event stream and/or an occurrence of a series of particular events with respect to a workflow can inform step 336. In particular, and as shown, when considering occurrences of events or sequences of events (step 334), an analysis module may examine a repository of workflow event metadata 333, and the results of analysis (e.g., identification of tags in the workflow metadata that have specific values) may be used to inform step 336.

It should be noted that, during processing of step 314, and more particularly, during execution of the foregoing analysis modules, it can sometimes happen that the scope of access to content objects and content object metadata might expand beyond the scope of access that is assigned to the user corresponding to the request. For example, during the execution of an analysis module for PII identification within a content object, it might happen that the analysis module needs to save tags into CMS metadata storage 320, even though the privileges of the user corresponding to the request does not include privileges to save tags into CMS metadata storage 320. This need can be accommodated, for example, by providing a brokering service that performs operations on behalf of a user. It should be noted that the term "user" as discussed herein refers to a natural person that has an associated permanent or temporary user profile in the CMS. A "user" is not merely an arbitrary IP address. Moreover, even though an "application" or "app" may be registered in the CMS, a "user" is distinct from an "application" or "app" at least in that an "application" or "app" refers to a collection of computer-executable code, whereas a "user" refers to a human being.

Further details regarding general approaches to generating security tags are described in U.S. application Ser. No. 17/390,153 titled "ESTABLISHING USER DEVICE TRUST LEVELS" filed on Jul. 30, 2021, which is hereby incorporated by reference in its entirety.

Further details regarding general approaches to detecting personally identifiable information are described in U.S. application Ser. No. 17/334,420 titled "MAPPING OF PERSONALLY-IDENTIFIABLE INFORMATION TO A PERSON BASED ON NATURAL LANGUAGE COREFERENCE RESOLUTION" filed on May 28, 2021, which is hereby incorporated by reference in its entirety.

Further details regarding general approaches to brokering workflows are described in U.S. application Ser. No. 17/447,559 titled "BROKER-ASSISTED WORKFLOWS" filed on Sep. 13, 2021, which is hereby incorporated by reference in its entirety.

Further details regarding general approaches to overriding permissions are described in U.S. application Ser. No. 16/948,828 titled "CONTEXT-AWARE CONTENT OBJECT SECURITY" filed on Oct. 1, 2020, which is hereby incorporated by reference in its entirety.

Figure 4:
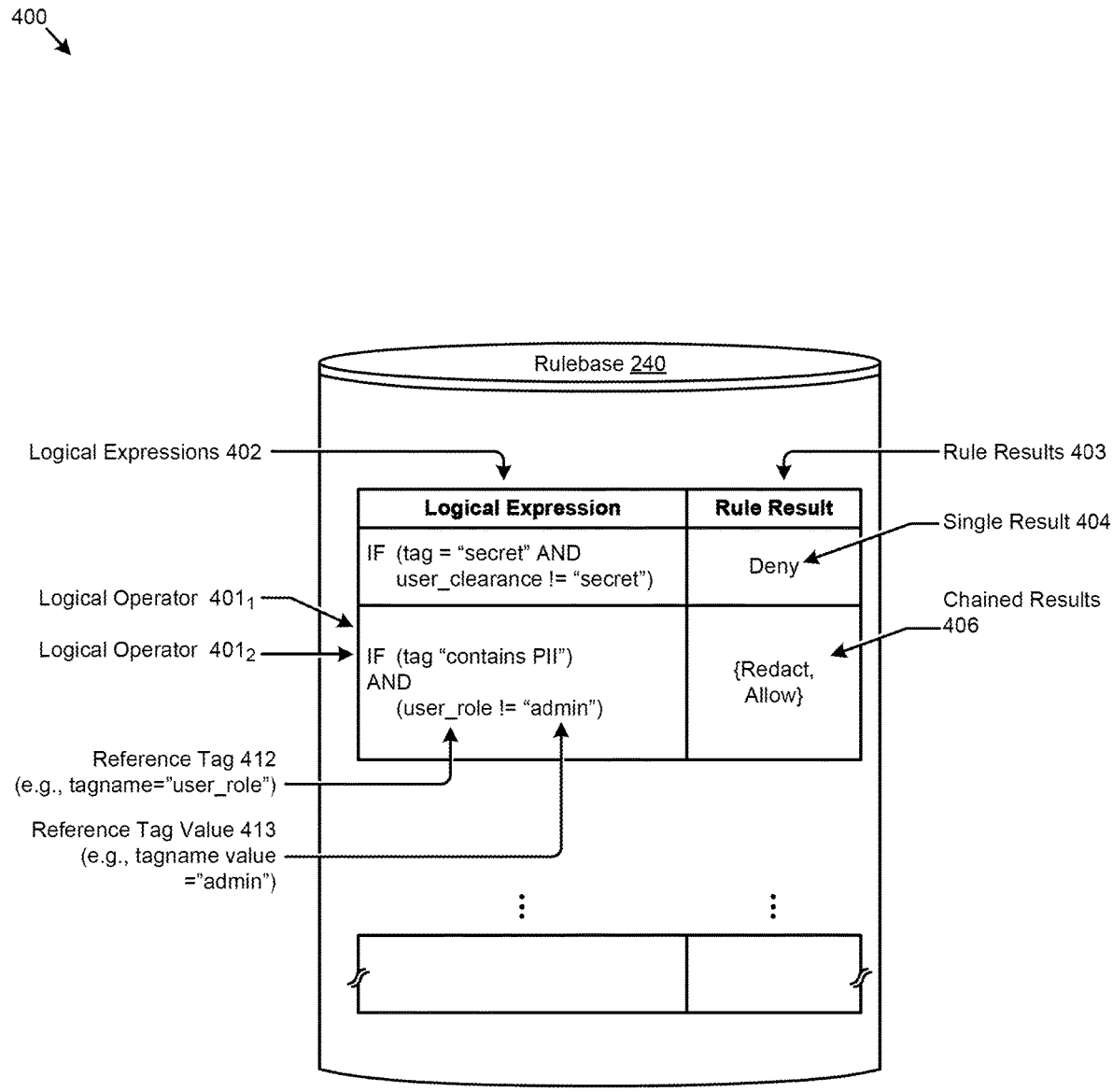
FIG. 4 shows an extensible rulebase as used in systems that implement modification of application programming interface behavior based on content-derived tag rules, according to an embodiment.

FIG. 4 shows an extensible rulebase as used in systems that implement modification of application programming interface behavior based on content-derived tag rules. As an option, one or more variations of extensible rulebase 400 or any aspect thereof may be implemented in the context of the architecture and functionality of the embodiments described herein and/or in any environment.

In the particular embodiment shown, rulebase 240 is formed by a table having rows and columns. Purely as an illustrative example, the table includes a column having cells that hold logical expressions 402 and a column that holds cells for rule results 403. If a particular logical expression of a particular row evaluates to TRUE, then the rule result in the same row is applied. For example, if a tag of a particular document is associated with the tag "secret" (or has the semantics of "secret"), then unless the security clearance of the user is also "secret" (or has the semantics of "secret"), then the rule result is "Deny" and accordingly, the requested access will be denied. The content management system can process an access request by applying any number of rules. The content management system can do so by matching a reference tag 412, or reference tag value 413 to a corresponding subject tag (e.g., document-specific tag) or subject tag value of a collaboration object.

A logical expression may contain any types of operators (e.g., an "IF" logical operator $401_1$, or an "AND" logical operator $401_2$). Also, a rule result can comprise a single result 404 or a chained result 406, where a chained result contains multiple actions to be carried out successively when the rule result is applied. In the shown example, the chained result "{Redact, Allow}" refers to a first, initial rule result operation to "Redact" PII from the file that is the subject of the requested access, followed by a second, chained rule result operation to "Allow" access to the result of the first, initial rule result operation. Continuing this example, once personally-identifiable information has been identified as being present within actual contents of the requested collaboration object, the chain processing of the rule might form a derivative collaboration object (e.g., a "PREVIEW") that does not contain the personally-identifiable information.

The foregoing rules can be applied at any point in time. However there are some situations where/when the looked-up, then-current tags (possibly including the then-current rights, permissions, or privileges) are undergoing changes that may have been precipitated by other users and/or may have been precipitated by currently-in-progress workflows that are sharing or processing the same sought-after electronic documents as given in an access request. For example, at the time when a change to a permission for a user is changed, that change might be made immediately in the database records at a first geographic zone, but at that immediate time, that change has not yet been propagated to a mirrored database in a second geographic zone. As another example, access to a document might be permittable during the particular timeframe when the document is being processed through a particular phase of a workflow, but not permittable during a different timeframe when the document is being processed through a different phase of the workflow. In these and other situations where either the rights, permissions, and/or privileges are undergoing changes and/or when some state in the collaboration system that is used to determine rights, permissions, and/or privileges is undergoing changes, it is possible that an authenticated user is denied access even though it can be predicted that the needed rights, permissions, and/or privileges might become available within a short time.

Unfortunately, returning a denial of access or other error code to the user device induces user frustration. In some cases, a denial would cause a user to exit from the session, impacting usability of the content management system for that user. Some means to avoid transient—soon to be resolved—denials of access is needed. More specifically, some means to introduce finite time delays into an allow/deny determination, so as to avoid the aforementioned user frustration is needed. One possible implementation for introducing a finite time delay into an allow/deny determination is shown and described as pertains to FIG. 5.

Figure 5:
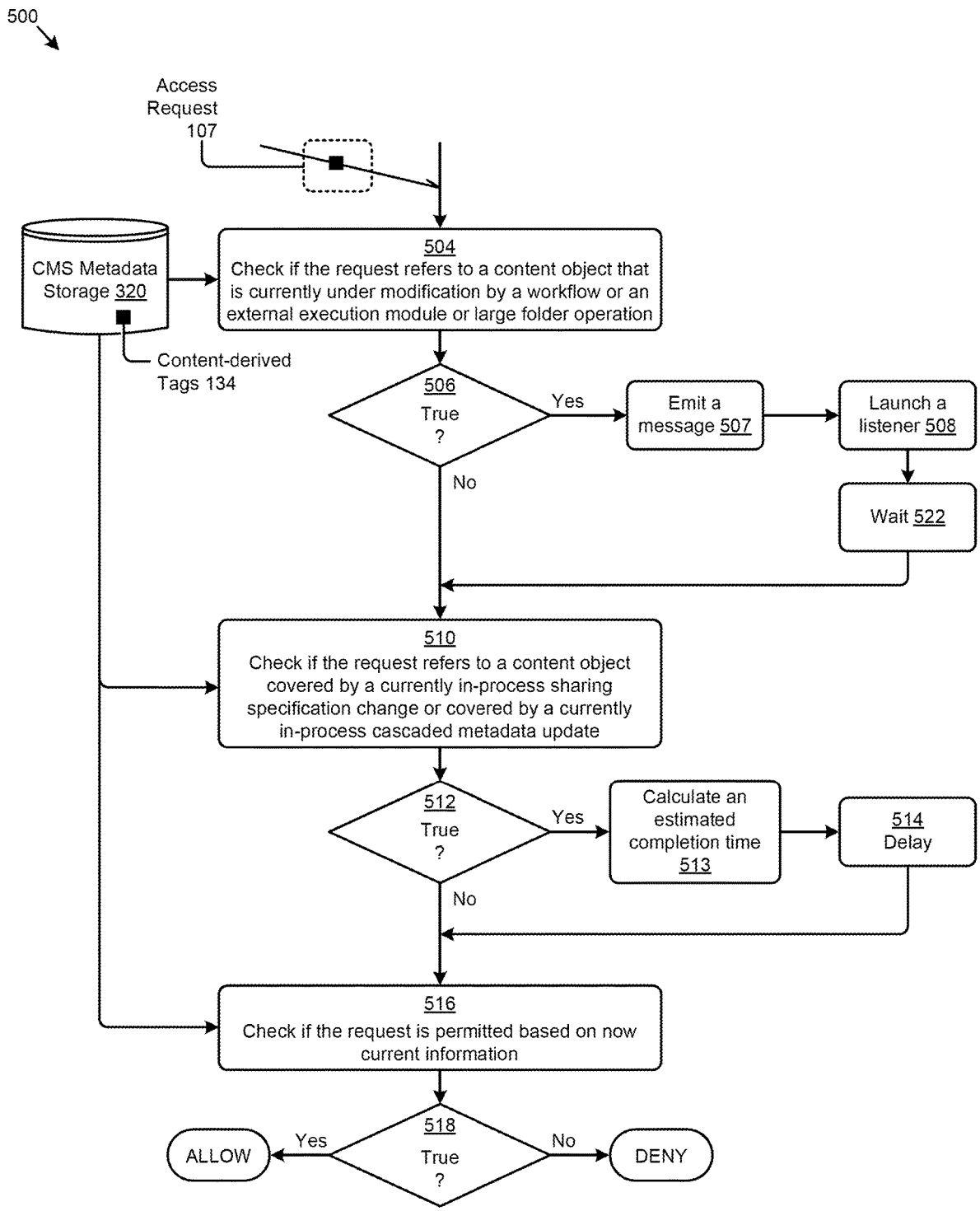
FIG. 5 shows a delayed allow/deny determination technique as implemented in systems that perform modification of application programming interface behavior based on content-derived tag rules, according to some embodiments.

FIG. 5 shows a delayed allow/deny determination technique as implemented in systems that perform modification of application programming interface behavior based on content-derived tag rules. As an option, one or more variations of delayed allow/deny determination technique 500 or any aspect thereof may be implemented in the context of the architecture and functionality of the embodiments described herein and/or in any environment.

The figure is being presented to illustrate how a CMS system can handle API requests to access files or folder that are known (e.g., by the content management system) to be currently undergoing changes that might affect any allow/deny determination. There are several such situations presented in the shown flow, specifically: (1) processing that is invoked when it is known that the requested file or folder is currently undergoing modification by a workflow; (2) processing that is invoked when it is known that the requested file or folder is currently undergoing modification of collaboration tags (e.g., changes to sharing groups) and/or is undergoing modification of content object metadata as a consequence of a cascaded metadata regime; and (3) processing that is invoked when it is known that an operation of a large number of content objects and/or their containing folders are currently underway (but expected to complete within a finite amount of time).

In one scenario of the specific flow shown, step 504 checks if access request 107 refers to a content object that is currently under modification by a workflow or currently under modification by an external execution module or currently under modification due to a large folder operation. If any of these clauses/tests are true (e.g., the "Yes" branch of decision 506) then, rather than immediately reaching any particular allow/deny determination, a delay of an indeterminate time period can be introduced. This delay of an indeterminate time period can be implemented by (1) launching a listener 508 that is specifically configured to listen for a completion event (e.g., a completion event from any one or more actions of a workflow, or a completion event of an external execution module, or a completion event after accomplishment of a large folder operation); and then (2) pending in wait 522 until such time as the completion event is detected by listener 508. In some cases, a message 507 is emitted to alert the caller that there may be some delay before the access request is allowed or denied.

In another scenario of the specific flow shown, step 510 checks to see if the request refers to a content object covered by a currently in-process sharing specification change or if the request refers to a content object covered by a currently in-process cascaded metadata update. This check can be surmounted by accessing specific then-current values in the CMS metadata storage 320. If any of these clauses/tests are true (e.g., the "Yes" branch of decision 512) then, rather than immediately reaching any particular allow/deny determination, a delay of an estimated time period can be introduced. This delay of an estimated time period can be implemented by (1) calculating an estimated completion time 513, and then (2) delaying for the estimated time period (step 514), or until such time as a completion event is detected. In some cases, a message 507 is emitted to alert the caller that there may be some delay before the access request is allowed or denied.

After the checks of step 504 and the checks of step of 516 have been performed (e.g., after taking either the "Yes" branch or the "No" branch of decision 506 or decision 512), then step 516 is undertaken to check for the then-current values in the CMS metadata storage 320 if the request is now permitted based upon updated information. If so, the "Yes" branch of decision 518 is taken and the access is allowed. Otherwise, the "No" branch of decision 518 is taken and the access is denied.

Additional Embodiments of the Disclosure

Instruction Code Examples

Figure 6A:
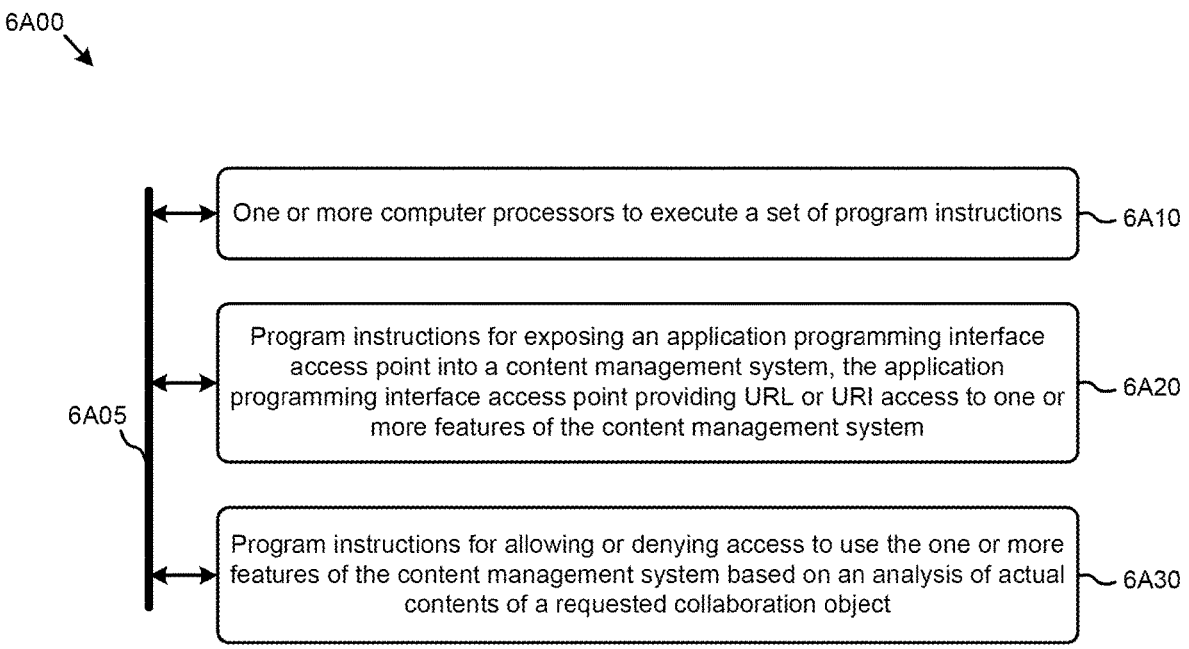
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually or as combined, serve to form improved technological processes that address content-based application programming interface behavior. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with any other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising one or more computer processors to execute a set of program code instructions (module 6A10) and modules for accessing memory to hold program code instructions to perform: exposing an application programming interface access point into a content management system, the application programming interface access point providing URL or URI access to one or more features of the content management system (module 6A20); and allowing or denying access to use the one or more features of the content management system based on an analysis of actual contents of a requested collaboration object (module 6A30).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 6B:
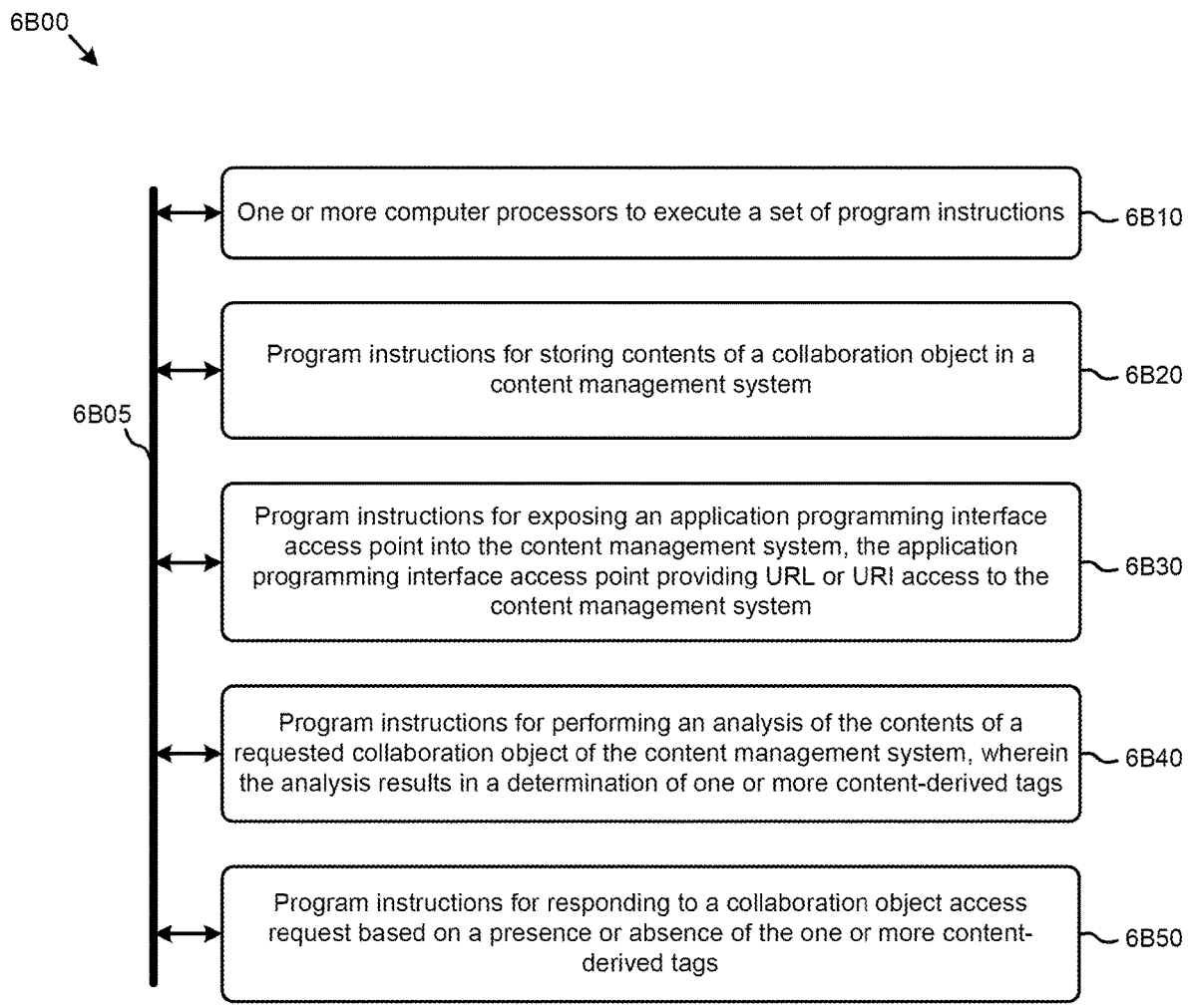

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with any other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising one or more computer processors to execute a set of program code instructions (module 6B10) and modules for accessing memory to hold program code instructions to perform: storing contents of a collaboration object in a content management system (module 6B20); exposing an application programming interface access point into the content management system, the application programming interface access point providing URL or URI access to the content management system (module 6B30); performing an analysis of the contents of a requested collaboration object of the content management system, wherein the analysis results in a determination of one or more content-derived tags (module 6B40); and responding to a collaboration object access request based on a presence or absence of the one or more content-derived tags (module 6B50).

System Architecture Overview

Additional System Architecture Examples

Figure 7A:
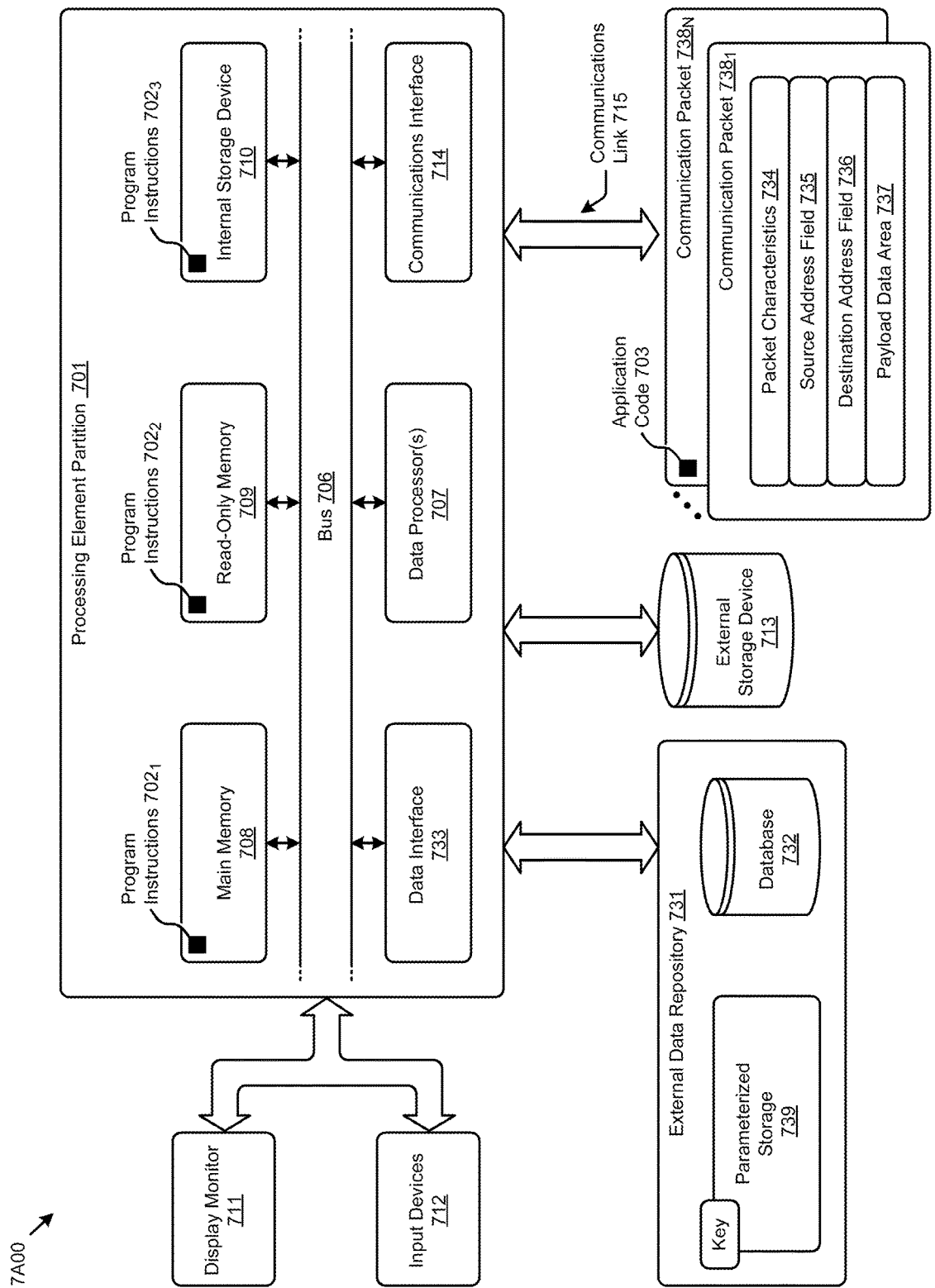
FIG. 7A and FIG. 7B present block diagrams of computer system architectures having components suitable for implementing embodiments of the present disclosure and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program instructions may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to content-informed application programming interfaces. A module may include one or more state machines and/or combinational logic used to implement or facilitate the operational and/or performance characteristics pertaining to behavior of content-informed application programming interfaces.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of content-informed application programming interfaces). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to content-informed application programming interfaces, and/or for improving the way data is manipulated when performing computerized operations pertaining to modifying API behavior based on tags that derive from analysis of human-intelligible content of CMS data.

Figure 7B:
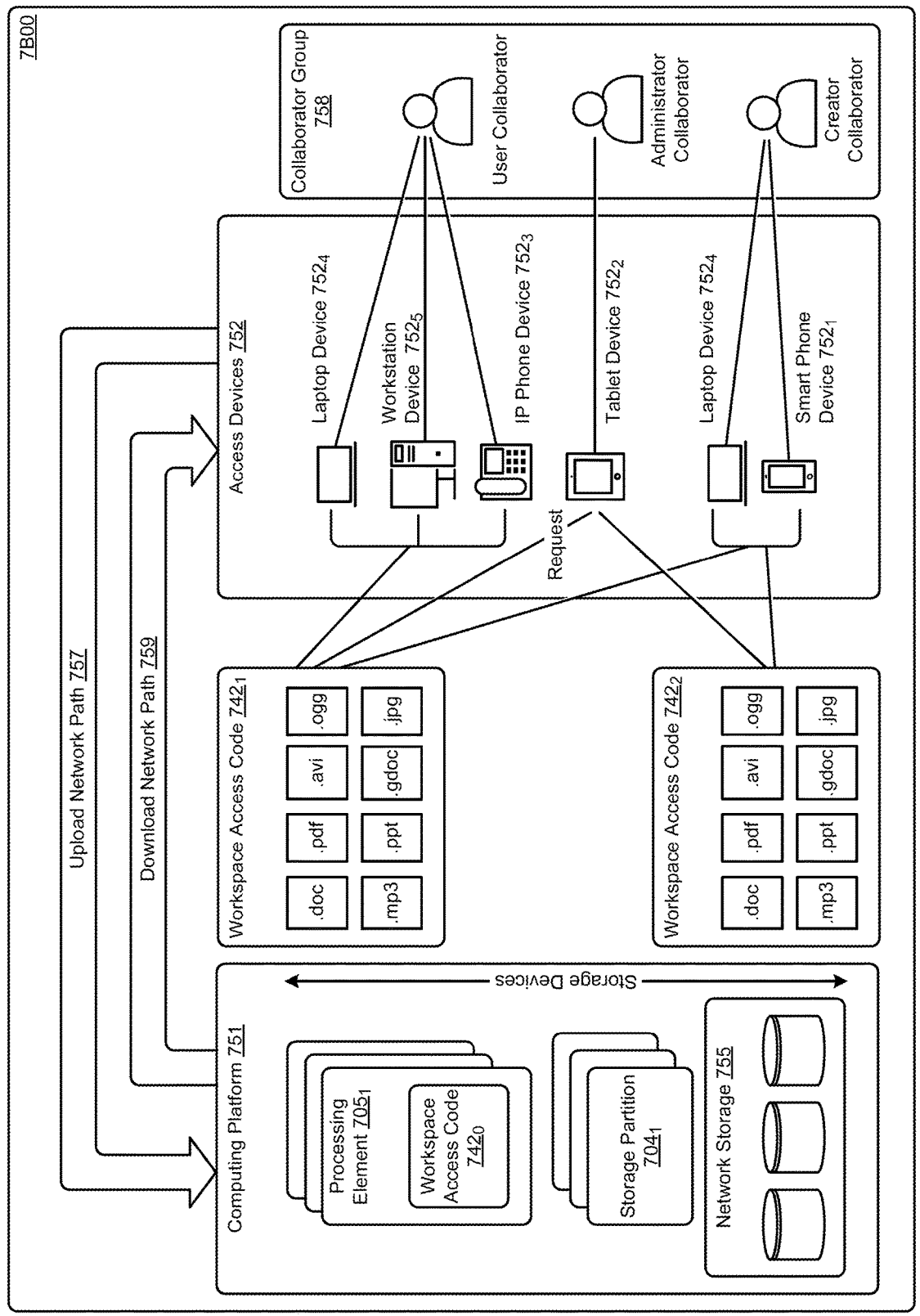

FIG. 7B depicts a block diagram of an instance of a cloud-based environment 7B00. Such a cloud-based environment supports access to workspaces through the execution of workspace access code (e.g., workspace access code 742$_0$, workspace access code 742$_1$, and workspace access code 742$_2$). Workspace access code can be executed on any of access devices 752 (e.g., laptop device 752$_4$, workstation device 752$_5$, IP phone device 752$_3$, tablet device 752$_2$, smart phone device 752$_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element 705$_1$). The workspace access code can interface with storage devices such as networked storage 755. Storage of workspaces and/or any constituent files or objects, and/or any other code or scripts or data can be stored in any one or more storage partitions (e.g., storage partition 704$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for real-time modification of application programming interface behavior, the method comprising:
    storing contents of a collaboration object in a content management system;
    exposing an access point of an application programming interface (API) into the content management system, the access point providing an access to the content management system;
    performing an analysis of the contents of or a folder comprising a requested collaboration object of the content management system, wherein the analysis results in a determination of one or more content-derived tags;

determining whether at least one rule or policy of a plurality of rules or policies for evaluating the one or more content-derived tags is satisfied, wherein a rule or policy is satisfied when an expression in the at least one rule or policy successfully evaluates at least one of the one or more content-derived tags in the at least one rule or policy against one or more corresponding tag values; and dynamically modifying a content-based behavior of the API in response to a request for the requested collaboration object based at least in part upon on whether the rule or policy successfully or unsuccessfully evaluates the one or more content-derived tags against the one or more corresponding tag values.

2. The method of claim 1, wherein the analysis of the contents of the requested collaboration object comprises identification of human-readable intelligence, and the content-based behavior of the API comprises a plurality of different levels of restrictions on the access to the requested collaboration object, the content-based behavior is modified to perform a first action when the at least one rule or policy is satisfied and is modified to perform a second action when the at least one rule or policy is not satisfied, and the access comprises a uniform resource locator (URL) access or uniform resource identifier (URI) access.

3. The method of claim 2, further comprising:
identifying the personal identifiable information within the human-readable intelligence of the requested collaboration object; and
forming a derivative collaboration object that does not contain the personal identifiable information.

4. The method of claim 2, further comprising:
performing a security level assessment of the derivative collaboration object based at least in part on the human-readable intelligence within the requested collaboration object;
determining at least one security-related content-derived tag at least by first converting the security level assessment into metadata or metadata value and further by converting the metadata or metadata value into the at least one security-related content-derived tag; and
associating the at least one security-related content-derived tag to the derivative content object.

5. The method of claim 1, further comprising:
responding to the request received at the access point of the application programming interface at least by:
determining that an application sending the request is a specific application that is registered with the content management system; and
determining a set of one or more application-specific tags based at least in part on registration information of the specific application, wherein dynamically modifying the content-based behavior of the API is based at least in part upon whether the requested collaboration object is associated with a specific tag and the one or more content-derived tags.

6. The method of claim 5, further comprising:
scanning a rulebase for existence of one or more rules that reference the set of one or more application-specific tags.

7. The method of claim 5, further comprising:
defining one or more newly-defined tags or newly-defined metadata;
associating the one or more newly-defined tags or the newly-defined metadata with the specific application; and
modifying the content-based behavior of the API in response to occurrence of the one or more newly-defined tags or the newly-defined metadata.

8. The method of claim 1, further comprising:
responding to the request by allowing or denying access to use one or more features of the content management system based at least in part on the analysis of the contents of the requested collaboration object.

9. The method of claim 1, wherein the contents are not external data outside of the collaboration object, and the contents are not derived from human-readable intelligence within a collaboration object, not a hash of the content, not a checksum of the content, and not a virus signature.

10. A non-transitory computer readable medium having stored thereon a sequence of instructions which, when stored in memory and executed by one or more processors causes the one or more processors to perform a set of acts for real-time modification of application programming interface behavior, the set of acts comprising:
storing contents of a collaboration object in a content management system;
exposing an access point of an application programming interface (API) into the content management system, the access point providing uniform resource locator (URL) or uniform resource identifier (URI) access to the content management system;
performing an analysis of the contents of or a folder comprising a requested collaboration object of the content management system, wherein the analysis results in a determination of one or more content-derived tags;
determining whether at least one rule or policy of a plurality of rules or policies for evaluating the one or more content-derived tags is satisfied, wherein a rule or policy is satisfied when an expression in the at least one rule or policy successfully evaluates at least one of the one or more content-derived tags in the at least one rule or policy against one or more corresponding tag values; and
dynamically modifying a content-based behavior of the API in response to a request for the requested collaboration object based at least in part on whether the rule or policy successfully or unsuccessfully evaluates the one or more content-derived tags against the one or more corresponding tag values.

11. The non-transitory computer readable medium of claim 10, wherein the analysis of the contents of the requested collaboration object comprises identification of human-readable intelligence, and the content-based behavior of the API comprises a plurality of different levels of restrictions on the access to the requested collaboration object, the content-based behavior is modified to perform a first action when the at least one rule or policy is satisfied and is modified to perform a second action when the at least one rule is not satisfied, and the access comprises a uniform resource locator (URL) access or uniform resource identifier (URI) access.

12. The non-transitory computer readable medium of claim 11, further comprising instructions which, when stored in memory and executed by the one or more processors causes the one or more processors to perform acts of:
identifying the personal identifiable information within the human-readable intelligence of the requested collaboration object; and
forming a derivative collaboration object that does not contain the personal identifiable information.

13. The non-transitory computer readable medium of claim 11, further comprising instructions which, when stored in memory and executed by the one or more processors causes the one or more processors to perform acts of:
    performing a security level assessment of the derivative collaboration object based at least in part on the human-readable intelligence within the requested collaboration object;
    determining at least one security-related content-derived tag at least by first converting the security level assessment into metadata or metadata value and further by converting the metadata or metadata value into the at least one security-related content-derived tag; and
    associating the at least one security-related content-derived tag to the derivative content object.

14. The non-transitory computer readable medium of claim 10, further comprising instructions which, when stored in memory and executed by the one or more processors causes the one or more processors to perform acts of:
    responding to the request received at the access point of the application programming interface at least by:
    determining that an application sending the request is a specific application that is registered with the content management system; and
    determining a set of one or more application-specific tags based at least in part on registration information of the specific application, wherein dynamically modifying the content-based behavior of the API is based at least in part upon whether the requested collaboration object is associated with a specific tag and the one or more content-derived tags.

15. The non-transitory computer readable medium of claim 14, further comprising instructions which, when stored in memory and executed by the one or more processors causes the one or more processors to perform acts of:
    scanning a rulebase for existence of one or more rules that reference the set of one or more application-specific tags.

16. The non-transitory computer readable medium of claim 14, further comprising instructions which, when stored in memory and executed by the one or more processors causes the one or more processors to perform acts of:
    defining one or more newly-defined tags or newly-defined metadata;
    associating the one or more newly-defined tags or the newly-defined metadata with the specific application; and
    modifying the content-based behavior of the API in response to occurrence of the one or more newly-defined tags or the newly-defined metadata.

17. The non-transitory computer readable medium of claim 10, further comprising instructions which, when stored in memory and executed by the one or more processors causes the one or more processors to perform acts of:
    responding to the request by allowing or denying access to use one or more features of the content management system based at least in part on the analysis of the contents of the requested collaboration object.

18. The non-transitory computer readable medium of claim 10, wherein the contents is not external data outside of the collaboration object, and the contents are is not derived from human-readable intelligence within a collaboration object, not a hash of the content, not a checksum of the content, and not a virus signature.

19. A system for real-time modification of application programming interface behavior, the system comprising:
    a storage medium having stored thereon a sequence of instructions; and
    one or more processors that execute the sequence of instructions to cause the one or more processors to perform a set of acts, the set of acts comprising,
    storing contents of a collaboration object in a content management system;
    exposing an access point of an application programming interface (API) into the content management system, the access point providing an access to the content management system;
    performing an analysis of the contents of or a folder comprising a requested collaboration object of the content management system, wherein the analysis results in a determination of one or more content-derived tags;
    determining whether at least one rule or policy of a plurality of rules or policies for evaluating the one or more content-derived tags is satisfied, wherein a rule or policy is satisfied when an expression in the at least one rule or policy successfully evaluates at least one of the one or more content-derived tags in the at least one rule or policy against one or more corresponding tag values; and
    dynamically modifying a content-based behavior of the API in response to a request for the requested collaboration object based at least in part on whether the rule or policy successfully or unsuccessfully evaluates the one or more content-derived tags against the one or more corresponding tag values.

20. The system of claim 19, wherein the analysis of the contents of the requested collaboration object comprises identification of human-readable intelligence, the content-based behavior of the API comprises a plurality of different levels of restrictions on access to the requested collaboration object, and dynamically modifying the content-based behavior of the API is based at least in part whether the request.

* * * * *